United States Patent
Krikorian et al.

(10) Patent No.: US 7,095,358 B2
(45) Date of Patent: Aug. 22, 2006

(54) TECHNIQUE FOR CANCELLATION OF ELEVATED CLUTTER FOR THE DETECTION OF FIXED AND GROUND MOVING TARGETS UNDER TREES

(75) Inventors: Kapriel V. Krikorian, Calabasas, CA (US); Robert A. Rosen, Simi Valley, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/996,024

(22) Filed: Nov. 23, 2004

(65) Prior Publication Data

US 2006/0109161 A1 May 25, 2006

(51) Int. Cl.
*G01S 13/90* (2006.01)
*G01S 7/292* (2006.01)

(52) U.S. Cl. .................. 342/25 B; 342/25 R; 342/159; 342/160; 342/161; 342/162; 342/175; 342/194; 342/195; 342/196

(58) Field of Classification Search .... 342/25 R–25 F, 342/26 R–26 D, 89–103, 159–197, 378–384
See application file for complete search history.

(56) References Cited

U.S. PATENT DOCUMENTS 3,713,153 A * 1/1973 van Popta .................. 342/160
3,735,400 A * 5/1973 Sletten et al. ............... 342/161
3,916,408 A * 10/1975 Evans et al. ................ 342/379
3,962,704 A * 6/1976 Evans ......................... 342/162
3,993,994 A * 11/1976 Goggins .................. 342/25 B
4,042,924 A * 8/1977 Evans et al. ................ 342/102
4,086,590 A * 4/1978 Goggins, Jr. ............. 342/25 B
4,688,044 A * 8/1987 O'Brien ...................... 342/160
5,291,209 A * 3/1994 Evans et al. ................ 342/381
5,311,188 A * 5/1994 Meijer et al. ................ 342/90
5,539,412 A * 7/1996 Mendelson .................. 342/192
5,546,084 A * 8/1996 Hindman .................. 342/25 F
5,818,383 A * 10/1998 Stockburger et al. ....... 342/161
6,297,772 B1 * 10/2001 Lewis ......................... 342/381
6,518,914 B1 * 2/2003 Peterson et al. .......... 342/25 R
6,633,253 B1 * 10/2003 Cataldo .................... 342/25 R

* cited by examiner

*Primary Examiner*—Bernarr E. Gregory
(74) *Attorney, Agent, or Firm*—Leonard A. Alkov; Karl A. Vick

(57) ABSTRACT

A target is detected under a forest canopy or other elevated clutter where the target is obscured by the elevated clutter. Radar returns reflected from the target on the surface, combined with those from the elevated clutter are digitized. Motion compensation is performed for the radar returns with respect to the target to obtain a focused first synthetic aperture image of the target. Next, the radar returns are motion compensated with respect to the elevated clutter at various heights above the surface to obtain images of the elevated clutter. The elevated clutter within the images at the various heights above the surface is identified and coherently subtracted from the original synthetic aperture images.

10 Claims, 5 Drawing Sheets

TECHNIQUE FOR CANCELLATION OF ELEVATED CLUTTER FOR THE DETECTION OF FIXED AND GROUND MOVING TARGETS UNDER TREES

BACKGROUND OF THE INVENTION

1. Field of the Invention

This invention is in the field of above ground clutter canceling for use with Synthetic Aperture Radar imaging.

2. Description of the Related Art

Synthetic Aperture Radar (SAR) radar is used for ground mapping as well as target identification. The general principle behind SAR is to coherently combine the amplitude and phase information of radar returns from a plurality of sequentially transmitted pulses from a relatively small antenna on a moving platform.

The plurality of returns creating a SAR image generated by the transmitted pulses along a known path of the platform make up a frame length. During the frame length, amplitude as well as phase information returned from each of the pulses, for each of many range bins, is preserved. The SAR image is formed from the coherent combination of the amplitude and phase of return(s) within each range bin, motion compensated for spatial displacement of the moving platform during the acquisition of the returns for the duration of the frame length.

The plurality of pulses transmitted during an SAR frame length, when coherently combined and processed, result in image quality comparable to a longer antenna, corresponding approximately to the "length" traveled by the antenna during the frame length.

However, where ground targets of interest are under a forest canopy or some other vegetative cover, the SAR imaging may not reliably detect the targets. In the prior at, lower operating frequencies (VHF and UHF) have been used to penetrate forest canopies. This is because VHF and UHF frequencies have lower attenuation through forest canopies or other vegetative cover, while still providing a radar return from metal, reflecting targets. However, this VHF and UHF approach failed in many instances.

SUMMARY OF THE INVENTION

Target detection on a surface under a forest canopy or other elevated clutter is improved for a radar for acquiring a synthetic aperture image. The target is obscured by the elevated clutter located at a height above the surface. The radar is mounted on a moving platform, and illuminates the target as well as the elevated clutter obscuring the target. The radar digitizes radar returns reflected from the target on the surface, combined with reflections from the elevated clutter. Within the radar is a computer for performing the steps of:

motion compensating said radar returns with respect to said target on said surface to obtain a focused first synthetic aperture image of said target on said surface;

motion compensating said radar returns with respect to said elevated clutter at one or more heights above said surface to obtain one or more focused clutter synthetic aperture images of said elevated clutter at each of said one or more heights;

identifying said elevated clutter within said one or more focused clutter synthetic aperture images at said one or more heights above said surface;

coherently subtracting said elevated clutter obtained from each of said one or more clutter synthetic aperture images from said radar returns thereby canceling said elevated clutter from said first synthetic aperture image to obtain an uncluttered image.

The coherent subtracting is iterated one or more times by substituting said uncluttered image for said first synthetic aperture image.

The radar combines radar returns obtained from a plurality of separate operating frequencies to generate the first synthetic aperture image and the clutter synthetic aperture images.

A plurality of uncluttered images are examined to extract motion parameters and features of moving targets on the surface. The plurality of uncluttered images are thresholded with respect to a noise estimate of one or more of the uncluttered images to facilitate tracking of moving target on the surface.

DETAILED DESCRIPTION OF THE INVENTION

The present invention describes an apparatus and method for canceling the effects of elevated clutter on SAR images of targets located below the elevated clutter.

Figure 1:
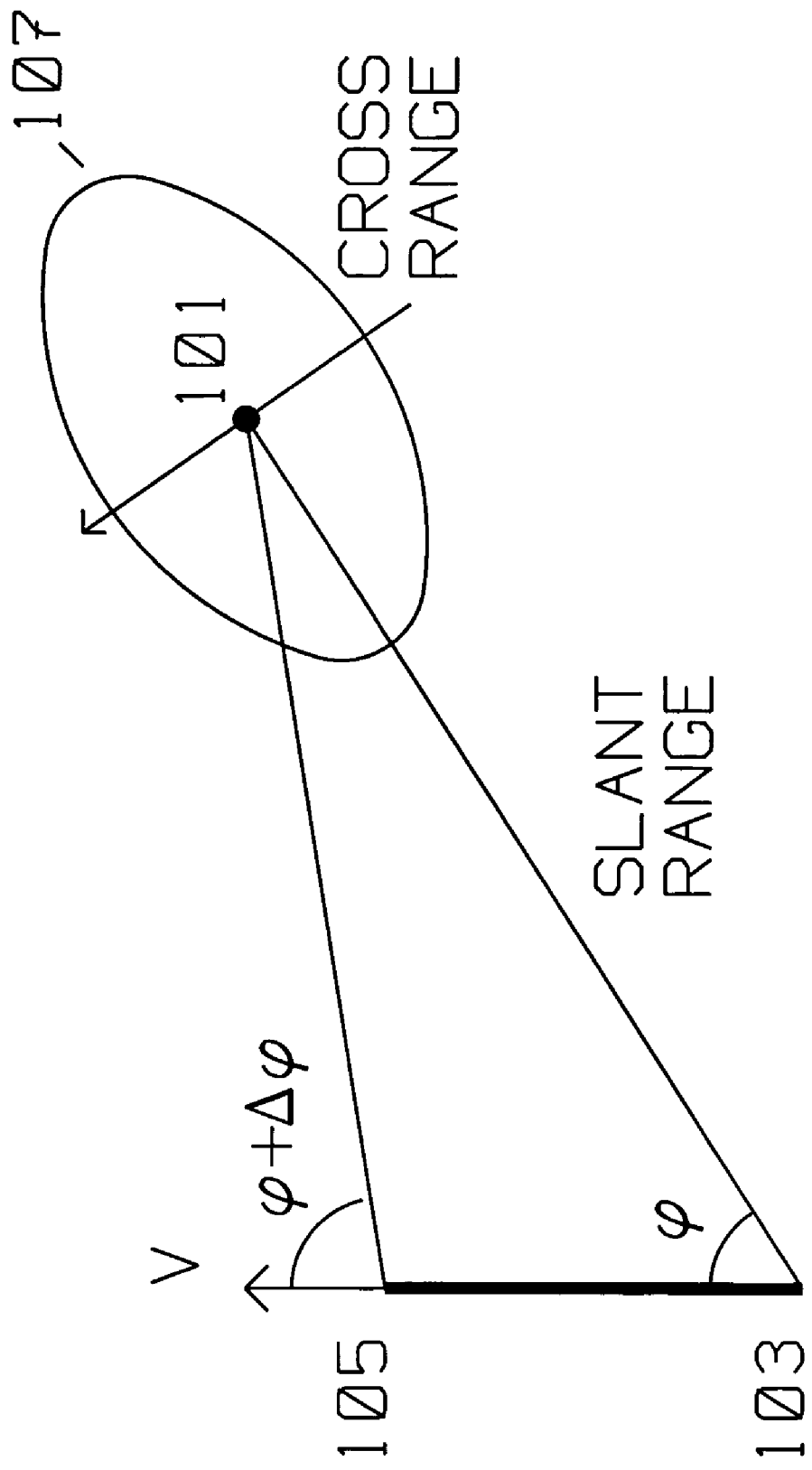
FIG. 1 is a SAR spotlight configuration of the prior art.

FIG. 1 shows the typical prior art geometric relationship between a moving platform carrying a radar transmitter/receiver using Synthetic Aperture (SAR) spotlight methods and target area 101 to be imaged by said radar transmitter/receiver. The moving platform is initially at position 103, travels with velocity in the direction shown to position 105. In SAR spotlight mode, the SAR antenna is actively oriented towards scatterer 101 as the platform moves with respect to scatterer 101 with velocity V. The moving platform moves from position 103 to position 105, while adjusting the side looking angle from $\phi$ to $\phi+\Delta\phi$ for spotlight mode so that the antenna keeps illuminating target area 101. Antenna illumination with radar energy covers area 107 during the frame length, and includes target area 101. Similarly, the antenna receive pattern covers area 107, and includes target area 101. Radar pulses are transmitted and corresponding returns received at many points during the frame length between position 103 and position 105. SAR radar is well known in the art and, for example, is described by W. Carrara, et al, in *Spotlight Synthetic Aperture Radar*, Artech house, 1995, incorporated herein be reference in its entirety.

Figure 2:
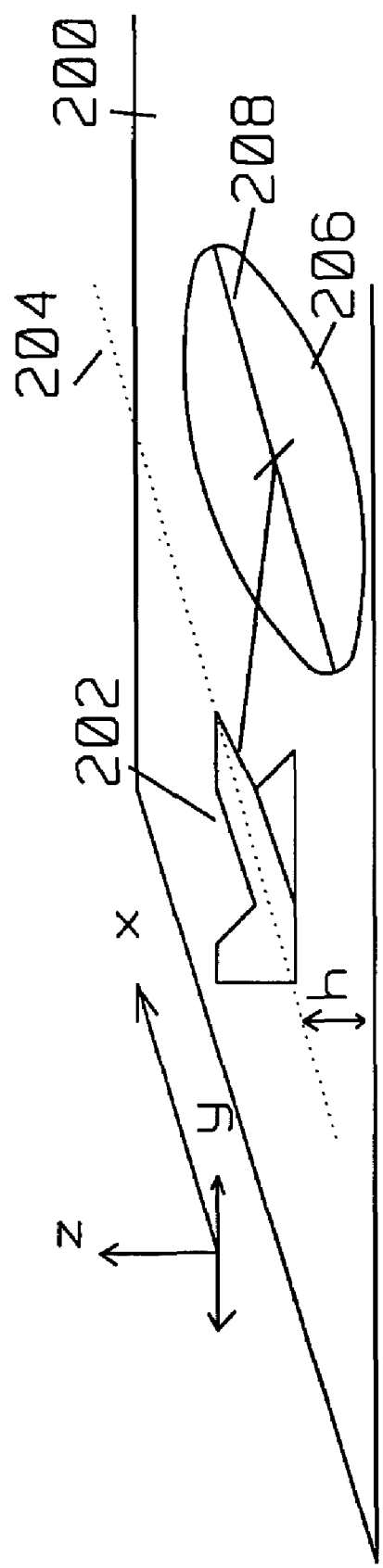
FIG. 2 shows a path of a moving platform (flying aircraft) defining an ideal, straight and level path along the centerline of a scene to be acquired for a SAR image.

A few assumptions are made for the operation of this invention, as shown in FIG. 2. The nominal flight path of the moving platform (flying aircraft) during the SAR frame is in a straight line parallel to the centerline of the scene being acquired, where the scene is flat.

Figure 3:
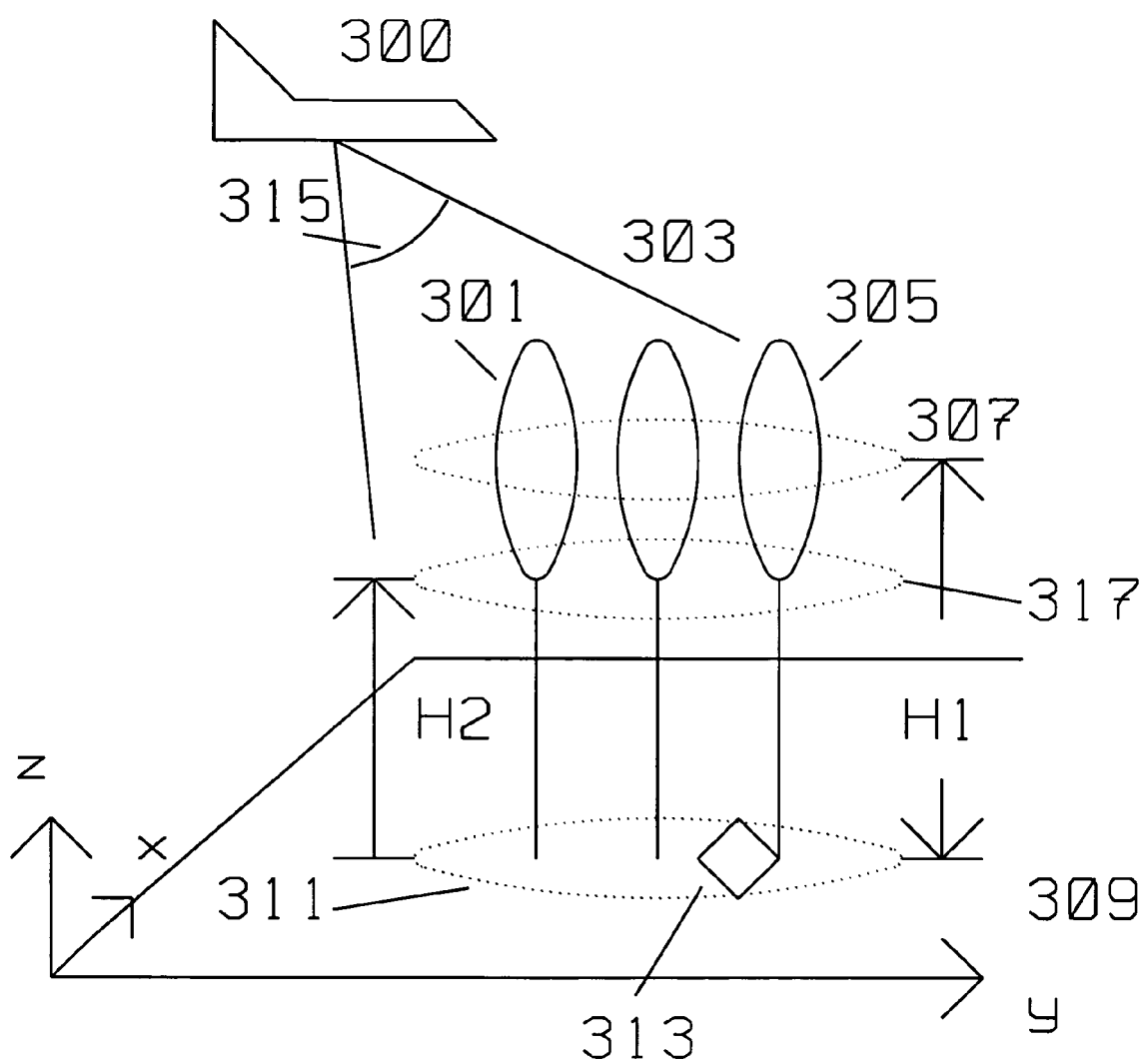
FIG. 3 shows a typical scene to be imaged where vegetation or other partially transparent, elevated clutter is introduced in the path of the radar returns precluding a clutter free SAR image.

Aircraft ideal track is a straight line, the scene is flat, in a plane parallel to the flight track, as shown in FIG. 2. Aircraft 202 is following flight path 204 in the x direction, at an altitude above flat area 200 and acquiring SAR image of scene 206. Scene 206 has a centerline 208, where centerline 208 is parallel to flight path 204. In FIG. 2, and used in this invention, direction is the direction of flight.

direction is perpendicular to x, parallel to the plane of the scene being imaged.

direction is normal to the plane of the scene, defined by $\hat{z} = \hat{x} \times \hat{y}$ FIG. 3 shows a moving platform 300 having a radar for acquiring a synthetic aperture image of a target 313 on a surface 309. Surface 309 is defined as in FIG. 2 in the x, y plane. The target 313 is obscured by elevated clutter such as, for example, vegetation or trees 301, 303 and 305 located at a height H1 and/or H2 above surface 309. Heights H1 and H2 are in the direction. The radar on moving platform 300 comprises a radar receiver for digitizing radar returns reflected from a combination of target 313 on surface 309, and from the elevated clutter. The radar has a radar beam 315 for concurrently illuminating surface 309 and elevated clutter 301, 303 and 305. Typically, beam 315 illuminates target 313 obscured by (partially transparent) clutter 301, 303, and 305.

The radar has a computer for:

a) motion compensating the radar returns with respect to target 313 on surface 309 to obtain a focused first synthetic aperture image 311 on surface 309;

b) motion compensating the radar returns with respect to elevated clutter at one or more heights, for example a height H1, above surface 309 to obtain a focused to obtain related one or more second synthetic aperture images, such as for example image 307 of the elevated clutter;

c) similarly motion compensating the radar returns with respect to elevated clutter at a height H2 above surface 309 to obtain a focused third synthetic aperture image 317 of the elevated clutter at height H2;

The I/Q components of the elevated clutter within the second synthetic aperture and/or third (or more) synthetic aperture image are identified and coherently subtracted from the first synthetic aperture image containing target 309. In some embodiments only the second synthetic aperture image 307 is provided. In other embodiments additional third, fourth or more synthetic aperture images are motion compensated to be focussed at different heights above surface 309. The coherent subtraction of elevated scatterers obtained from one or more synthetic aperture images motion compensated at various heights above surface 309 effectively remove the radar signal obscuration from elevated clutter (e.g. 301, 305 and 305) from the first synthetic aperture image of the surface and its target, improving the target's image clarity.

PREFERRED EMBODIMENT

Figure 4:
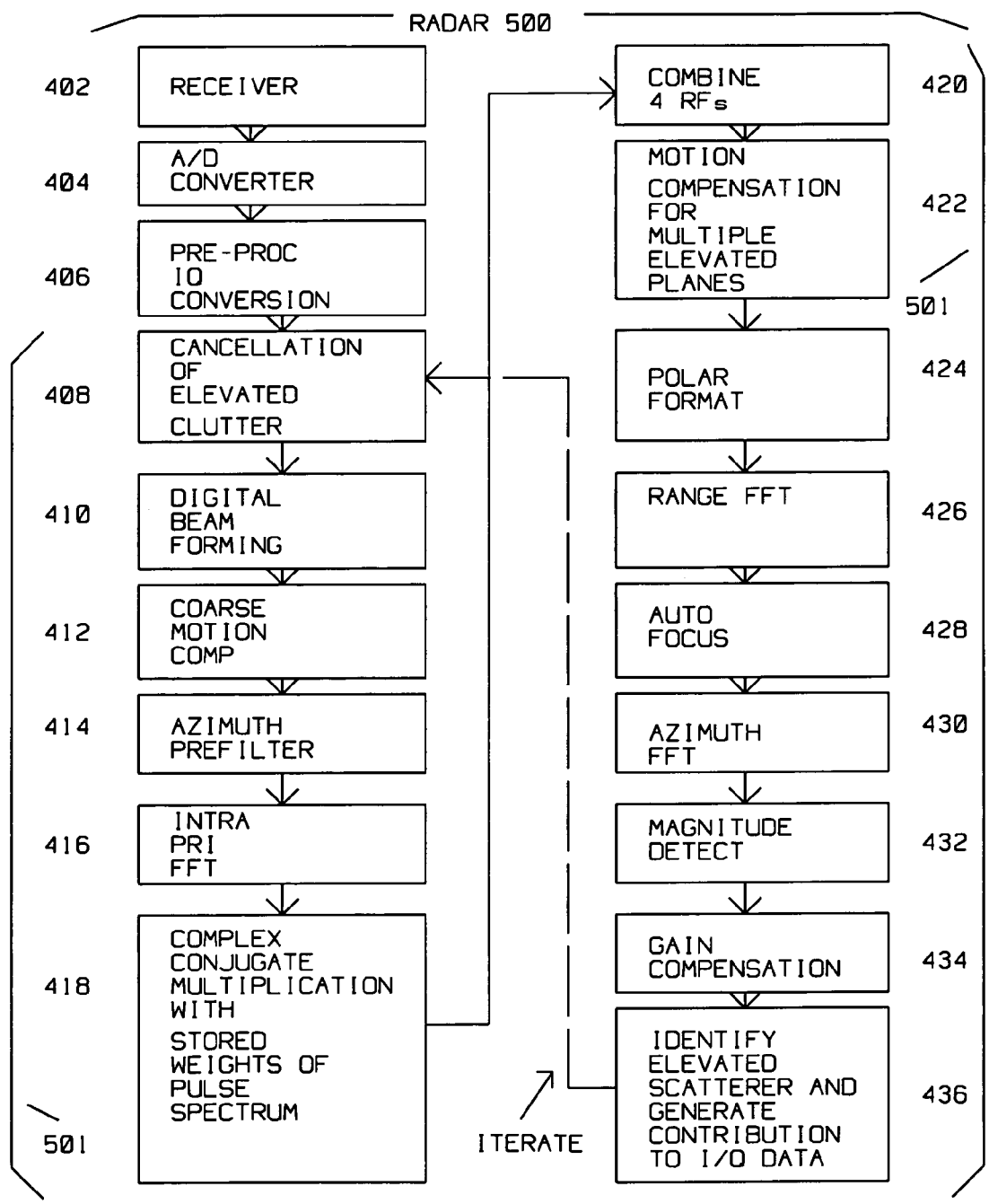
FIG. 4 is a flow diagram of the present invention for canceling elevated clutter from a SAR image.

FIG. 4 shows method steps of a preferred embodiment of the invention. Receiver 402 part of a typical radar 500 receives radar returns reflected from the combination of target 313 as well as elevated clutter 301, 303 and 305. 8 channels are used for a 6 KM swath. A/D converter 404 digitizes the received radar returns at a rate corresponding to the desired range bin size. An 80 MHz rate (real), 12 bits/channel is utilized to produce a 2K range pixel by 2 K cross range pixel map with 4 meter resolution and 1 meter azimuth resolution in 60 seconds.

The digital values from A/D converter 404 become the I and Q complex values defining the phase of the return. Preprocessor I/Q conversion 406 uses a weight of 16, skip 4, real processing using a 14 MHz pass band, 20 MHz output sample rate, generating 2 bytes for 1 and 2 bytes for Q. The output is 20 Mega-complex words at 4 bytes per word per second, assuming a 50 percent margin. SAR PRF is selected to eliminate sidelobe foldovers.

The iterative portion of the invention computed in a typical computer such as computer 501 starts with Cancellation of elevated clutter 408. Here, elevated scatterers found in Identify Elevated Scatterer and Generate Contribution to I/Q Data 436 are coherently subtracted from the original I/Q data supplied from 406. On the first pass through the iterative loop no elevated scatterer information from 436 has yet been computed.

The I/Q data is used in Digital Beam Forming 410 and Coarse motion compensation 412. Subsequently, Azimuth Prefilter 414 and Intra PRI FFT 416 further process complex radar data. A plurality of frequencies, for example 4, are used in the VHF and UHF band to penetrate elevated clutter 301, 303, and 305 and illuminate ground location where target 313 is located. The information from these multiple frequencies are combined in Combine 4 RFs 420.

The return information thus derived is motion compensated for multiple elevated planes. That is, Motion Compensation for Multiple Elevated Planes 422 will take the output from 420 and motion compensate for different heights H1, H2 above ground level. A plurality of such motion compensation heights can be chosen depending on the height of the vegetation cover and other artifacts that may be present in the scene. A plurality of SAR motion compensated data emerge, one for each motion compensation height.

After motion compensation, the data for each of the multiple motion compensated data are transformed in Polar format 424, then Range FFT 426. Auto focus 428 is applied to each of the multiple motion compensated data, as well as Azimuth FFT 430. Magnitude detect 432 and Gain Compensation 434 are also applied to each of the motion compensated data.

Each of the motion compensated data is now examined in Identify Elevated Scatterer and Generate Contribution to I/Q Data 436. Elevated scatterers in each of the motion compensated data (except the ground image) are identified and translated to their contribution to the original I/Q data. This contribution is sent to 408 so as to cancel elevated scatterer influence on the overall SAR image by subtracting scatterer I/Q data from the original digital stream emerging from 406. After one or more iterations, the original radar data is purged of elevated scatterers and the resulting SAR image of fixed targets such 313 on the ground plane 309 is made clear. To reduce the computational load imposed by multiple motion compensated data, the data is pre-filtered prior to the iterative process.

Figure 5:
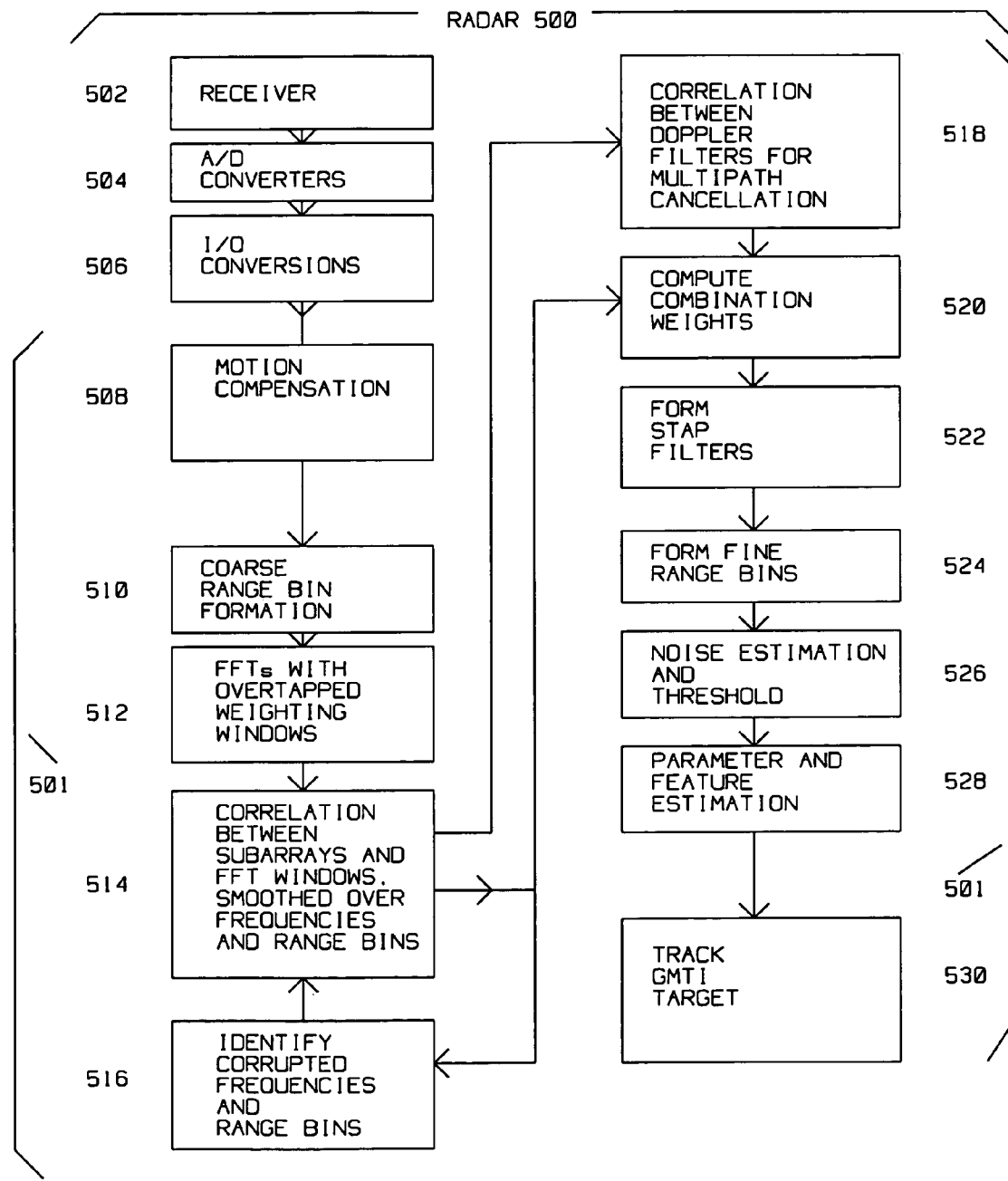
FIG. 5 shows a flow diagram of the present invention where elevated clutter is reduced using the principles of this invention for Ground Moving Target Indicator (GMTI) tracking.

The concept is carried one step further for the processing of ground moving targets (GMT). After fixed targets are detected in 436, the radar data as well as the pre-filtered data with canceled elevation clutter is used for ground moving target detection (GMTI). The original radar input data provides exoclutter GMT detection while the prefiltered data emerging from 436 provides endoclutter detection of slow GMTs. FIG. 5 shows a method for GMT processing and a Space Time Adaptive Algorithm (STAP) for slow moving target detection. FIG. 5 is an example of UHF GMTI processing after the cancellation of elevated clutter (e.g. trees, vegetation etc.)using multiplane SAR processing of FIG. 4.

As shown in FIG. 5, receiver 502, part of a typical radar 500 receives radar returns reflected from the combination of target 313 as well as elevated clutter 301, 303 and 305. 8 channels are used. A/D converters 504 digitize the received radar returns at a rate corresponding to the desired range bin size. An 80 MHz rate (real), 12 bits/channel is utilized.

The digital values from A/D converters 504 become the I and Q complex values defining the phase of the return forming a SAR image. In the best mode, I/Q conversion 506 uses a weight of 16, skip 4, real processing using a 14 MHz pass band, 20 MHz output sample rate, generating 2 bytes for 1 and 2 bytes for Q. The output is 20 Mega-complex words at 4 bytes per word, per second, assuming a 50 percent margin per channel.

Within a typical computer, such as computer 501, Motion compensation 508 and Coarse Range Bin Formation 510 further processes the radar I/Q data to align its contents for a plurality of SAR images focussed at different heights above the elevated clutter obscured target. The results are fed into FFTs With Overtapped Weighting Windows 512. Subsequently, the output from 512 is smoothed in Correlation Between Subarrays and FFT Windows Smoothed over Frequencies and Range Bins 514 to obtain smoothed data. The smoothed data is analyzed in Identify Corrupted Frequencies and Range Bins 516 to delete corrupted frequencies and range bins that may be left over and input back into 514.

In an alternate path, the smoothed data is also filtered by Correlation Between Doppler Filters For Multipath Cancellation 518 where the effects of multipath induced errors are canceled. This yields multipath canceled data.

The smoothed data from 514 is combined in Compute Combination Weights 520 with the multipath canceled data from 518 and presented to Form STAP filters 522. The output from STAP filters 522 is separated in Form Fine Range Bins 524 to obtain smaller, more accurate range bins within the images.

Noise Estimation and Threshold 526 extracts a noise average for a whole image, then thresholds that image (i.e. the digital data descriptive of the image) above said noise average to generate a thresholded image. This effectively eliminates the noise component.

The moving target is found within the thresholded image by Parameter and Feature Estimation 528. For a sequence of SAR images, 528 generates a plurality of target parameters such as velocity and direction of motion, as well as a preferably constant identifying feature(s) to allow Track GMTI target 530 to track the target and predict said target's path. Typically, target position estimates from a series of images are input into a tracking mechanism, such as, for example, a Kalman filter residing within Track GMTI target 530 to track target motion. A Kalman filter is a well known method used to combine motion information from various sources of position, velocity and acceleration measurements.

All references cited in this document are incorporated herein in their entirety by reference.

Although presented in exemplary fashion employing specific embodiments, the disclosed structures are not intended to be so limited. For example, using 8 channels at the indicated data rates is a convenience occasioned by the available hardware. Using the concepts of this invention, along with more channels and higher data rates, coupled with higher computing power for the method shown herein, will render SAR images of higher resolution and allow better GMTI target tracking.

Those skilled in the art will also appreciate that numerous changes and modifications could be made to the embodiment described herein without departing in any way from the invention.

The invention claimed is:

1. A radar for acquiring a synthetic aperture image of a target on a surface, said target obscured by an elevated clutter at a height above said surface, said radar comprising:
a radar receiver mounted on a moving platform for illuminating said target obscured by said elevated clutter and for digitizing radar returns reflected from said target on said surface, and from said elevated clutter;
a computer for performing the steps of:
motion compensating said radar returns with respect to said target on said surface to obtain a focused first synthetic aperture image of said target on said surface;
motion compensating said radar returns with respect to said elevated clutter at one or more heights above said surface to obtain one or more focused clutter synthetic aperture images of said elevated clutter at each of said one or more heights;
identifying said elevated clutter within said one or more focused clutter synthetic aperture images at said one or more heights above said surface;
coherently subtracting said elevated clutter obtained from each of said one or more clutter synthetic aperture images from said radar returns thereby canceling said elevated clutter from said first synthetic aperture image to obtain an uncluttered image.

2. A radar system as described in claim 1 wherein said coherent subtracting is iterated one or more times by substituting said uncluttered image for said first synthetic aperture image.

3. A radar system as described in claim 2, wherein said radar combines radar returns obtained from a plurality of separate operating frequencies to generate said first synthetic aperture image and said clutter synthetic aperture images.

4. A radar system as described in claim 3 wherein a plurality of uncluttered images are examined to extract motion parameters and features of moving targets on said surface.

5. A radar system as described in claim 4 wherein said uncluttered images are thresholded with respect to a noise estimate of one or more of said uncluttered images.

6. A method using a radar for acquiring a synthetic aperture image of a target on a surface, said target obscured by an elevated clutter at a height above said surface, said method comprising the steps of:
illuminating said target obscured by said elevated clutter and said elevated clutter;
digitizing radar returns reflected from said target on said surface, and from said elevated clutter;
motion compensating said radar returns with respect to said target on said surface to obtain a focused first synthetic aperture image of said target on said surface;
motion compensating said radar returns with respect to said elevated clutter at one or more heights above said surface to obtain one or more focused clutter synthetic aperture images of said elevated clutter at each of said one or more heights;
identifying said elevated clutter within said one or more focused clutter synthetic aperture images at said one or more heights above said surface;

coherently subtracting said elevated clutter obtained from each of said one or more clutter synthetic aperture images from said radar returns thereby canceling said elevated clutter from said first synthetic aperture image to obtain an uncluttered image.

7. A method as described in claim 6 wherein said coherent subtracting is iterated one or more times by substituting said uncluttered image for said first synthetic aperture image.

8. A method as described in claim 7, wherein said radar returns are obtained from a plurality of separate operating frequencies to generate said first synthetic aperture image and said clutter synthetic aperture images.

9. A method as described in claim 8 wherein a plurality of uncluttered images are examined to extract motion parameters and features of moving targets on said surface.

10. A method as described in claim 9 wherein said uncluttered images are thresholded with respect to a noise estimate of one or more of said uncluttered images.

* * * * *